United States Patent [19]
Antonucci et al.

[11] 4,176,891
[45] Dec. 4, 1979

[54] SALVAGE METHOD FOR CATHODE RAY TUBES

[75] Inventors: Ermen S. Antonucci; Duane L. Cadden, both of Waterloo; Albert Regenbrecht, Seneca Falls; Edward Schwartz, Auburn, all of N.Y.

[73] Assignee: GTE Sylvania Incorporated, Stamford, Conn.

[21] Appl. No.: 945,677

[22] Filed: Sep. 25, 1978

[51] Int. Cl.² .............................................. H01J 9/50
[52] U.S. Cl. .......................................... 316/2; 156/344
[58] Field of Search ............................ 316/2; 156/344

[56] References Cited
U.S. PATENT DOCUMENTS

| | | | |
|---|---|---|---|
| 2,843,925 | 7/1958 | Logue et al. | 156/344 |
| 2,884,312 | 4/1959 | Kuryla | 156/344 |
| 3,390,033 | 6/1968 | Brown | 156/344 X |

*Primary Examiner*—Richard B. Lazarus
*Attorney, Agent, or Firm*—William H. McNeill

[57] ABSTRACT

In a salvaging method for shadow mask containing glass cathode ray tubes whereby the glass funnel portion is separated from the face panel at the frit seal by etching the external portion of the seal and subsequently creating a thermal shock to fracture the frit seal by causing a temperature differential between the funnel and the panel, the improvement comprising protecting the mask with a chemically basic covering prior to separation to insulate the mask from any acidic material which might be present.

5 Claims, 4 Drawing Figures

SALVAGE METHOD FOR CATHODE RAY TUBES

TECHNICAL FIELD

This invention relates to a method for salvaging glass cathode ray tubes employed for displaying color images and specifically relates to a method for also recovering the shadow mask employed therein.

BACKGROUND ART

Glass cathode ray tubes employed for the presentation of color images are comprised of a glass funnel portion sealed at its wide end to a glass, dish-shaped face panel by means of a glass frit. The face panel contains on the inside surface thereof a phosphor screen which has suspended behind it a metallic shadow mask.

In the prior art it is taught that the glass of such tubes can be salvaged by immersing the seal area in an acid bath, for example nitric acid, which may be heated, to etch away a portion of the external frit area. The glass envelope is then subjected to a series of alternately hot then cold water baths which create a temperature differential between the funnel and the face panel and cause the frit seal to fracture by means of induced thermal shock.

Such techniques are known from U.S. Pat. No. 2,884,312 and U.S. Pat. No. 3,390,033.

DISCLOSURE OF INVENTION

This invention relates to an improvement in the above-described processes which allows the contained shadow mask to be also salvaged, without developing rust thereon. These results are accomplished by wetting the mask with a basic solution prior to the funnel-panel separation to insulate the mask from the slightly acidic water subsequently employed during the thermal shock.

BEST MODE FOR CARRYING OUT THE INVENTION

For a better understanding of the invention, together with other and further objects, advantages and capabilities thereof, reference is made to the following disclosure and appended claims taken in conjunction with the above-described drawings.

Figure 1:
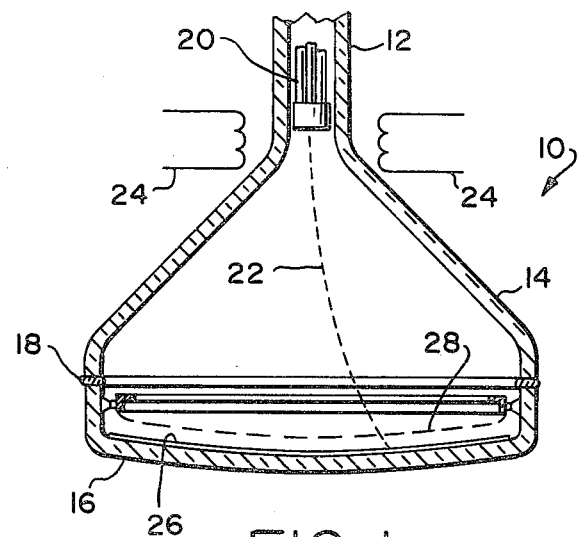
FIG. 1 is a sectioned plan view of a cathode ray tube.

Referring now to the drawings with greater particularity, there is shown in FIG. 1 a color cathode ray tube 10 having a glass envelope with a neck 12, a cone or funnel 14 and a dish-shaped face panel 16. The cone 14 and face panel 16 are frit sealed together, as at 18, as is conventional in the art. Positioned within neck 12 is a gun structure 20 for providing the source, focussing and acceleration of the electron beam or beams 22, which are deflected by coils 24 to provide scanning of the luminescent screen 26.

A thin foraminated shadow mask 28 is mounted within the face panel 16 between the gun 20 and screen 26 and aids in appropriate color selection.

During construction of the tube screen 26 is formed on the interior surface of panel 16, mask 28 is mounted therein and cone 14 is subsequently connected thereto by frit seal 18. This seal is accomplished by positioning a frit-ring around panel 16, placing cone 14 thereon and subsequently heating the frit and the seal areas of the cone and panel to a fusion temperature. The frit ring may comprise any glass composition which is calcined or partially fused by heat at a temperature below the temperature necessary to provide vitrification.

When a cathode ray tube is found to be defective after construction and testing, or after its normal operating life has expired, it is advantageous from a cost standpoint to dis-assemble and re-use the envelope. To accomplish this objective, cone 14 may be separated from pnel 16 by a process wherein frit seal 18 is initially etched to weaken the seal and the lateral dimensions of the core or panel are altered relative to one another by expansion or contraction to provide a shear stress on seal 18 to cause cracking thereof.

Figure 2:
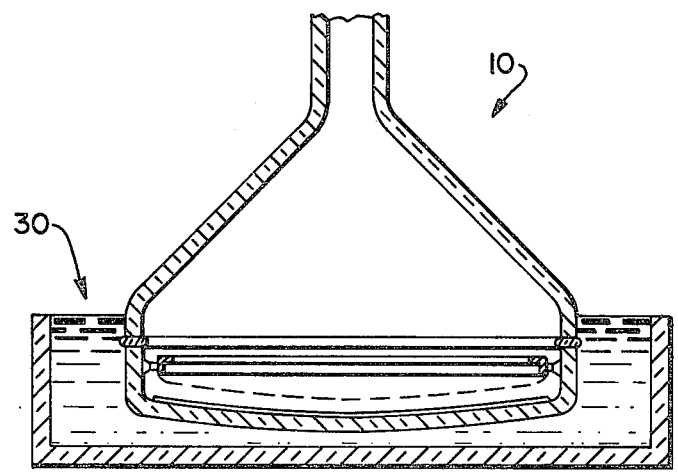
FIG. 2 is a similar view illustrating, diagrammatically, a step in the prior art process.
Figure 3:
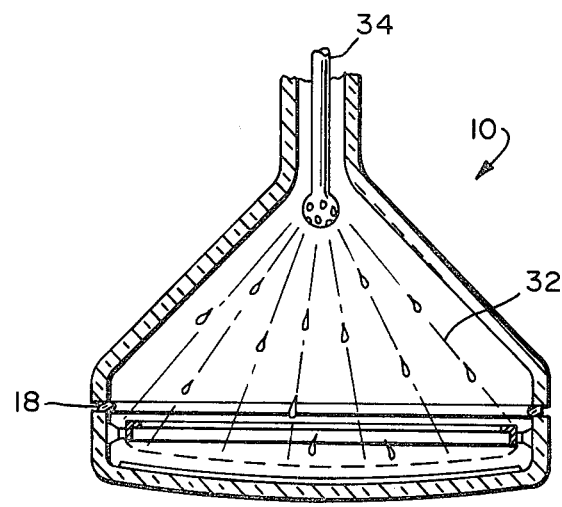
FIG. 3 is a similar view illustrating, diagrammatically, a step in the invention.
Figure 4:
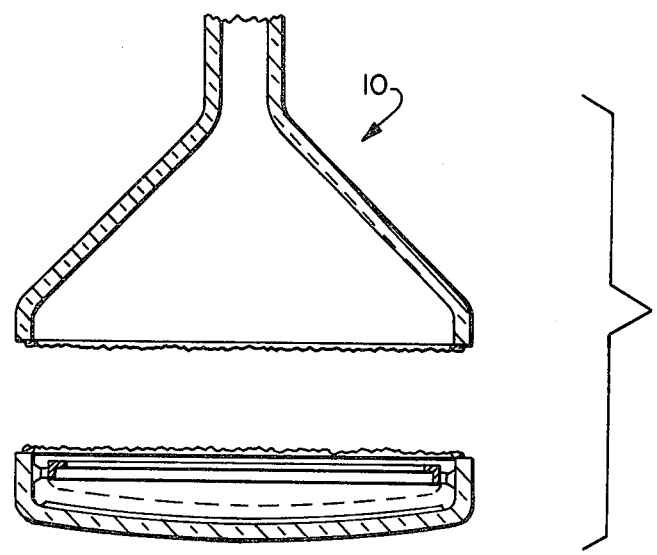
FIG. 4 is a similar view illustrating the fracture of the funnel-panel assembly.

In this process, the tube may be immersed face down in an etching fluid bath 30, (FIG. 2) comprised of nitric or hydrofluoric acid preferably to a depth sufficient to allow the acid to extend a short distance above seal 18. The tube may be kept in this position for a period of time, e.g. 10 minutes for a 1.8 normal solution of nitric acid, to allow etching of seal 18 as illustrated in FIG. 3. In order to condition the seal 18 for the shearing action, the acid is preferably maintained at a temperature above 100 degrees F. After the etching operation has been completed, a cooling medium such as water, which can be in the form of a spray, having a temperature below 80 degrees F. is applied to the area around seal 18 so that it strikes the cone 14 near the seal and causes contraction thereof. Since the temperature of the cone is lower than that of the panel, a stress due to the cone contraction causes frit seal 18 to shear, thereby facilitating separation of the cone 14 from panel 16. After the cone and panel have been sheared apart, (FIG. 4) the remaining frit is removed from the cone and panel and they are ready for reuse.

As noted above, this process has been employed successfully for many years; however, while the process salvaged the glass of the bulb, it usually destroyed the shadow mask contained therein. The destruction arose because upon separation the slightly acidic cooling water would be splattered upon the mask causing instant rusting of this fragile, expensive structure.

The improved process disclosed herein obviates this problem and allows the shadow mask to be salvaged along with the glass envelope so that all may be subsequently reused.

In FIG. 3 is shown the step of substantially completely wetting the contained shadow mask with a basic solution 32 before separation of the panel and cone occurs.

Preferably, this is accomplished by inserting a spray nozzle 34 through neck 12 and spraying a fine mist of the basic solution to substantially wet mask 28.

After the mask 28 is wetted the separation described may occur, since the mask is protected from stray droplets of the slightly acidic water used in the cooling solution to initiate shear.

Virtually any appropriate basic solution can be employed so long as that solution is easily removable and causes no damage to the mask; however, the preferred solution is one comprised of a 2% to 8% (by volume) solution of morpholene ($C_4H_8NO$) and distilled, deionized water. Within this range, a 5% solution is preferred.

While there have been shown and described several embodiments of the invention, it will be apparent to those skilled in the art that various changes and modifications can be made herein without departing from the scope of the invention as defined by the appended claims.

INDUSTRIAL APPLICABILITY

The invention can best be exploited by industry in the recovery and reuse of shadow masks from salvaged cathode ray tubes.

We claim:

1. In a method of salvaging the glass envelope and enclosed metal shadow mask of a color cathode ray tube, said glass envelope comprising a funnel portion open at its narrow end and a dish-shaped face panel sealed to its wide end by means of a glass frit, said metal shadow mask being suspended within said face panel and wherein said funnel and said face panel are separated by etching the external portion of said frit and subsequently causing a temperative differential between said funnel and said panel whereby said frit fractures from thermal shock, the improvement comprising the step of, prior to said separation, depositing upon at least the upper surface of said mask a chemically basic solution.

2. The method of claim 1 wherein said chemically basic solution is applied by spraying, a spray dispensing nozzle being introduced through said open narrow end.

3. The method of claim 2 wherein said chemically basic solution contains morpholine.

4. The method of claim 3 wherein said chemically basic solution comprises morpholine and distilled, dionized water.

5. The method of claim 4 wherein said morpholine comprises, by volume, 2% to 8% of said solution.

* * * * *